US012257925B2

(12) United States Patent
Yeo et al.

(10) Patent No.: US 12,257,925 B2
(45) Date of Patent: Mar. 25, 2025

(54) CONVERTER AND POWER CONVERSION SYSTEM FOR VEHICLE AUXILIARY BATTERY

(71) Applicants: Foundation for Research and Business, Seoul National University of Science and Technology, Seoul (KR); Hyundai Motor Company, Seoul (KR); Kia Corporation, Seoul (KR)

(72) Inventors: In Yong Yeo, Bucheon-si (KR); Youn Sik Lee, Suwon-si (KR); Se Wan Choi, Seoul (KR)

(73) Assignees: Hyundai Motor Company, Seoul (KR); Foundation for Research and Business, Seoul National University of Science and Technology, Seoul (KR); Kia Corporation, Seoul (KR)

( * ) Notice: Subject to any disclaimer, the term of this patent is extended or adjusted under 35 U.S.C. 154(b) by 282 days.

(21) Appl. No.: 18/054,742

(22) Filed: Nov. 11, 2022

(65) Prior Publication Data

US 2024/0051431 A1 Feb. 15, 2024

(30) Foreign Application Priority Data

Aug. 9, 2022 (KR) .................. 10-2022-0099367

(51) Int. Cl.
*B60L 50/60* (2019.01)
*B60L 53/20* (2019.01)
(Continued)

(52) U.S. Cl.
CPC .............. *B60L 58/22* (2019.02); *B60L 50/60* (2019.02); *B60L 53/20* (2019.02); *B60L 53/80* (2019.02);
(Continued)

(58) Field of Classification Search
CPC .......... B60L 58/22; B60L 50/60; B60L 53/20; B60L 53/80; B60L 2210/12; B60L 2240/547; B60L 2240/549; B60L 58/12; B60L 58/20; H02J 7/0016; H02J 7/0063; H02J 7/342; H02J 2207/20; H02J 7/0013; H02J 7/0048; H02J 7/0068;
(Continued)

(56) References Cited

U.S. PATENT DOCUMENTS

2018/0334043 A1* 11/2018 Zou .................. H02M 1/08

FOREIGN PATENT DOCUMENTS

KR 101809913 B1 12/2017
KR 101811062 B1 12/2017

* cited by examiner

*Primary Examiner* — Elim Ortiz
*Assistant Examiner* — Xuan Ly
(74) *Attorney, Agent, or Firm* — Slater Matsil, LLP

(57) ABSTRACT

A power conversion system includes: a main battery configured to be recharged with power and to supply the recharged power to a motor, thereby supplying rotation force to a wheel of a vehicle; an auxiliary battery configured to recharge the main battery or to assist a power supply function of the main battery; and a power converter connected to auxiliary battery, the power converter comprising a bypass circuit and a buck converter. The buck converter includes a buck switch, and is configured to convert a voltage of the auxiliary battery into a voltage for recharging the main battery in accordance with an ON/OFF switching operation of the buck switch.

18 Claims, 7 Drawing Sheets

(51) Int. Cl.
    *B60L 53/80*     (2019.01)
    *B60L 58/22*     (2019.01)
    *H02J 7/00*     (2006.01)
    *H02J 7/34*     (2006.01)
    *H02M 3/156*     (2006.01)
    *H02M 1/42*     (2007.01)

(52) U.S. Cl.
    CPC .......... *H02J 7/0016* (2013.01); *H02J 7/0063* (2013.01); *H02J 7/342* (2020.01); *H02M 3/156* (2013.01); *B60L 2210/12* (2013.01); *H02J 2207/20* (2020.01); *H02M 1/4208* (2013.01)

(58) Field of Classification Search
    CPC .......... H02J 7/007182; H02J 7/00; H02J 7/34; H02M 3/156; H02M 1/4208; H02M 1/007; H02M 3/01; H02M 3/33569
    USPC ........................................................ 307/10.1
    See application file for complete search history.

CONVERTER AND POWER CONVERSION SYSTEM FOR VEHICLE AUXILIARY BATTERY

CROSS-REFERENCE TO RELATED APPLICATIONS

This application claims the benefit of Korean Patent Application No. 10-2022-0099367, filed on Aug. 9, 2022, which application is hereby incorporated herein by reference.

TECHNICAL FIELD

The present invention relates to a power conversion system, and more particularly to a converter and a power conversion system for converting electric power of an auxiliary battery for a vehicle.

BACKGROUND

In pace with recently increased interest in the environment, use of an eco-friendly vehicle provided with an electric motor as a power source is increasing. Such an eco-friendly vehicle is also referred to as an electrified vehicle, and as a representative example thereof, there are a hybrid electric vehicle (HEV) or an electric vehicle (EV).

Generally, in mini or light electric vehicles, cost competitiveness is of utmost importance, and cost reduction of power electronics (PE) elements as well as a high-voltage battery is very important. Meanwhile, the most expensive one of high-voltage power electronics elements is a high-voltage battery. Although the cost of such a power electronics element may be reduced through minimization of the capacity of the power electronics element, a reduction in the capacity of the high-voltage battery may result in not only a reduction in the range of an electric vehicle, but also a reduction in outputs of a motor and an inverter.

Recently, studies attempting a reduction in capacity and a reduction in voltage in a battery have been conducted in order to minimize the price of an electric vehicle. In order to minimize the electric vehicle price, development of an electric vehicle constituted by a 48V-grade system is also being conducted. In addition, development of a system capable of not only increasing the range of an electric vehicle, but also enhancing outputs of a motor and an inverter, through addition of a replaceable auxiliary battery to a main battery of 48V, is being conducted.

Meanwhile, although rated capacities of the main battery and the auxiliary battery are 48V, each of the main battery and the auxiliary battery may have an output of about 30 to 60V in accordance with a state of charge (SOC) thereof. When batteries different in SOC are directly interconnected, there is a danger of fire.

Therefore, the current situation in the present technical field is that it is necessary to provide a converter capable of managing the state of charge of each auxiliary battery, effectively controlling charging current, and enabling each battery to be effectively used.

SUMMARY

It will be appreciated by persons skilled in the art to which the present invention pertains that technical problems to be solved by the present invention are not limited to the above-described technical problems, and other technical problems will be more clearly understood from the following description.

In accordance with an aspect of the present invention, the above and other objects can be accomplished by the provision of a power conversion system including a main battery configured to be recharged with power and to supply the charged power to a motor, thereby supplying rotation force to a wheel of a vehicle, at least one auxiliary battery configured to recharge the main battery or to assist a power supply function of the main battery, and at least one power converter connected to the at least one auxiliary battery, the at least one power converter including at least one bypass circuit and at least one buck converter, wherein the buck converter includes a buck switch, and converts a voltage of the auxiliary battery into a voltage for recharging the main battery in accordance with an ON/OFF switching operation of the buck switch.

The buck switch may operate to be repeatedly switched on and off when the voltage of the auxiliary battery is higher than a voltage of the main battery, and may not operate when the voltage of the auxiliary battery is not higher than the voltage of the main battery.

The bypass circuit may electrically interconnect the auxiliary battery and the main battery when the voltage of the auxiliary battery is equal to the voltage of the main battery.

The at least one bypass circuit may include a plurality of bypass circuits, and the at least one buck converter may include a plurality of buck converters. The at least one auxiliary battery may include a plurality of auxiliary batteries connected to respective bypass circuits and respective buck converters, and each of the auxiliary batteries may supply power to the main battery by a corresponding one of the bypass circuits and a corresponding one of the buck converters.

The at least one bypass circuit may include a plurality of bypass circuits, and the at least one auxiliary battery may include a plurality of auxiliary batteries connected to respective bypass circuits and respective relay switches. Each of the relay switches may connect or disconnect a corresponding one of the auxiliary batteries to or from the buck converter, and each of the auxiliary batteries may supply power to the main battery by the buck converter and the bypass circuit connected to the auxiliary battery.

The relay switches may be set such that only one thereof is switched on at one time.

The relay switches may be sequentially switched on in accordance with a predetermined priority order.

The auxiliary battery may be provided in the form of a swappable battery.

The bypass circuit may include a first diode, and a first switch connected to the diode in series.

The buck converter may include first and second capacitors, a first inductor and a buck switch interconnected in series between one end of the first capacitor and one and of the second capacitor, and a second diode connected, at one end thereof, to a node between the first inductor and the buck switch while being connected, at another end thereof, to a node between the first capacitor and the second capacitor.

In accordance with another aspect of the present invention, there is provided a DC-DC converter receiving an input voltage, thereby generating an output voltage, the DC-DC converter including at least one power converter connected to a main battery and at least one auxiliary battery, the at least one power converter including at least one bypass circuit and at least one buck converter, wherein the buck converter includes a buck switch, and converts a voltage of the auxiliary battery into a voltage for recharging the main battery in accordance with an ON/OFF switching operation of the buck switch.

The buck switch may operate to be repeatedly switched on and off when the voltage of the auxiliary battery is higher than a voltage of the main battery, and may not operate when the voltage of the auxiliary battery is not higher than the voltage of the main battery.

The bypass circuit may electrically interconnect the auxiliary battery and the main battery when the voltage of the auxiliary battery is equal to the voltage of the main battery.

The at least one bypass circuit may include a plurality of bypass circuits, and the at least one buck converter may include a plurality of buck converters. The at least one auxiliary battery may include a plurality of auxiliary batteries connected to respective bypass circuits and respective buck converters, and a power supply path of each of the auxiliary batteries connected to the main battery may be switched by a corresponding one of the bypass circuits and a corresponding one of the buck converters.

The at least one bypass circuit may include a plurality of bypass circuits, and the at least one auxiliary battery may include a plurality of auxiliary batteries connected to respective bypass circuits and respective relay switches. Each of the relay switches may connect or disconnect a corresponding one of the auxiliary batteries to or from the buck converter in accordance with an ON/OFF switching operation thereof. A power supply path of each of the auxiliary batteries connected to the main battery may be switched by the buck converter and the bypass circuit connected to the auxiliary battery.

The relay switches may be set such that only one thereof is switched on at one time.

The relay switches may be sequentially switched on in accordance with a predetermined priority order.

The bypass circuit may include a first diode, and a first switch connected to the diode in series.

The buck converter may include first and second capacitors, a first inductor and a buck switch interconnected in series between one end of the first capacitor and one and of the second capacitor, and a second diode connected, at one end thereof, to a node between the first inductor and the buck switch while being connected, at another end thereof, to a node between the first capacitor and the second capacitor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Figure 1:
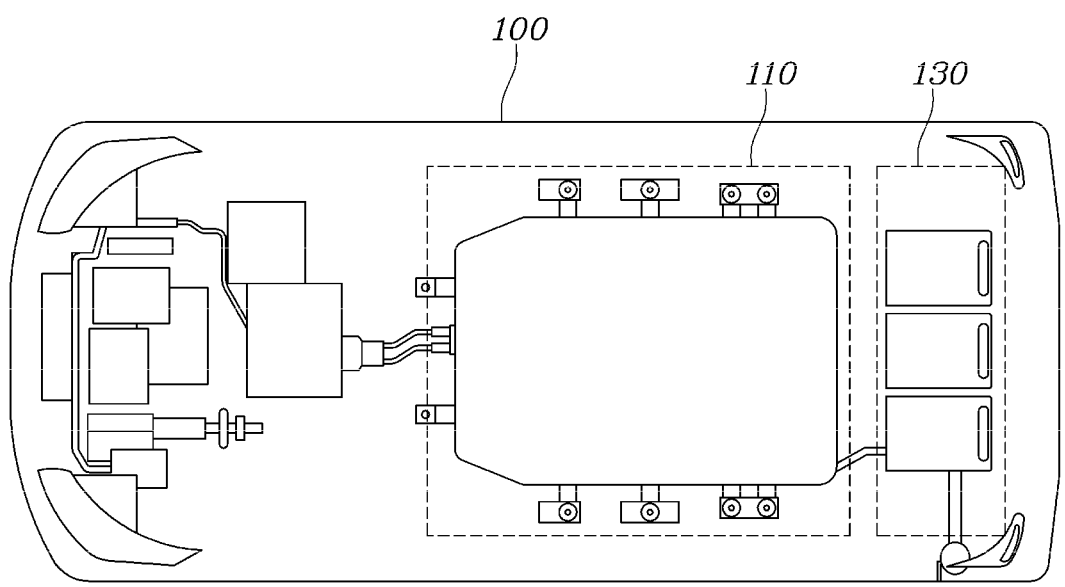
FIG. 1 shows a vehicle to which a power conversion system according to an exemplary embodiment of the present invention is applied.

Hereinafter, embodiments of the present invention will be described in detail with reference to the accompanying drawings, and the same or similar elements are designated by the same reference numerals regardless of the numerals in the drawings and redundant description thereof will be omitted. The suffixes "module" and "unit" of elements herein are used for convenience of description and thus can be used interchangeably and do not have any distinguishable meanings or functions. In the following description of the embodiments of the present invention, a detailed description of known functions and configurations incorporated herein will be omitted when it may obscure the subject matter of the embodiments of the present invention. In addition, the embodiments of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween.

Unless clearly used otherwise, singular expressions include a plural meaning.

In this specification, the term "comprising," "including," or the like, is intended to express the existence of the characteristic, the numeral, the step, the operation, the element, the part, or the combination thereof, and does not exclude another characteristic, numeral, step, operation, element, part, or any combination thereof, or any addition thereto.

Some embodiments of the present invention provide a converter capable of managing a state of charge of each auxiliary battery and effectively controlling charging current. Embodiments may also provide a converter capable of enabling batteries to be effectively used.

FIG. 1 shows a vehicle 100 to which a power conversion system according to an exemplary embodiment of the present invention is applied.

Referring to FIG. 1, the vehicle 100 includes a main battery no and an auxiliary battery 130. The vehicle 100 uses energy stored in the main battery no as a power source for driving a motor. When the stored energy of the main battery no is discharged, the vehicle 100 receives power from the auxiliary battery 130, thereby recharging the main battery no.

Figure 2:
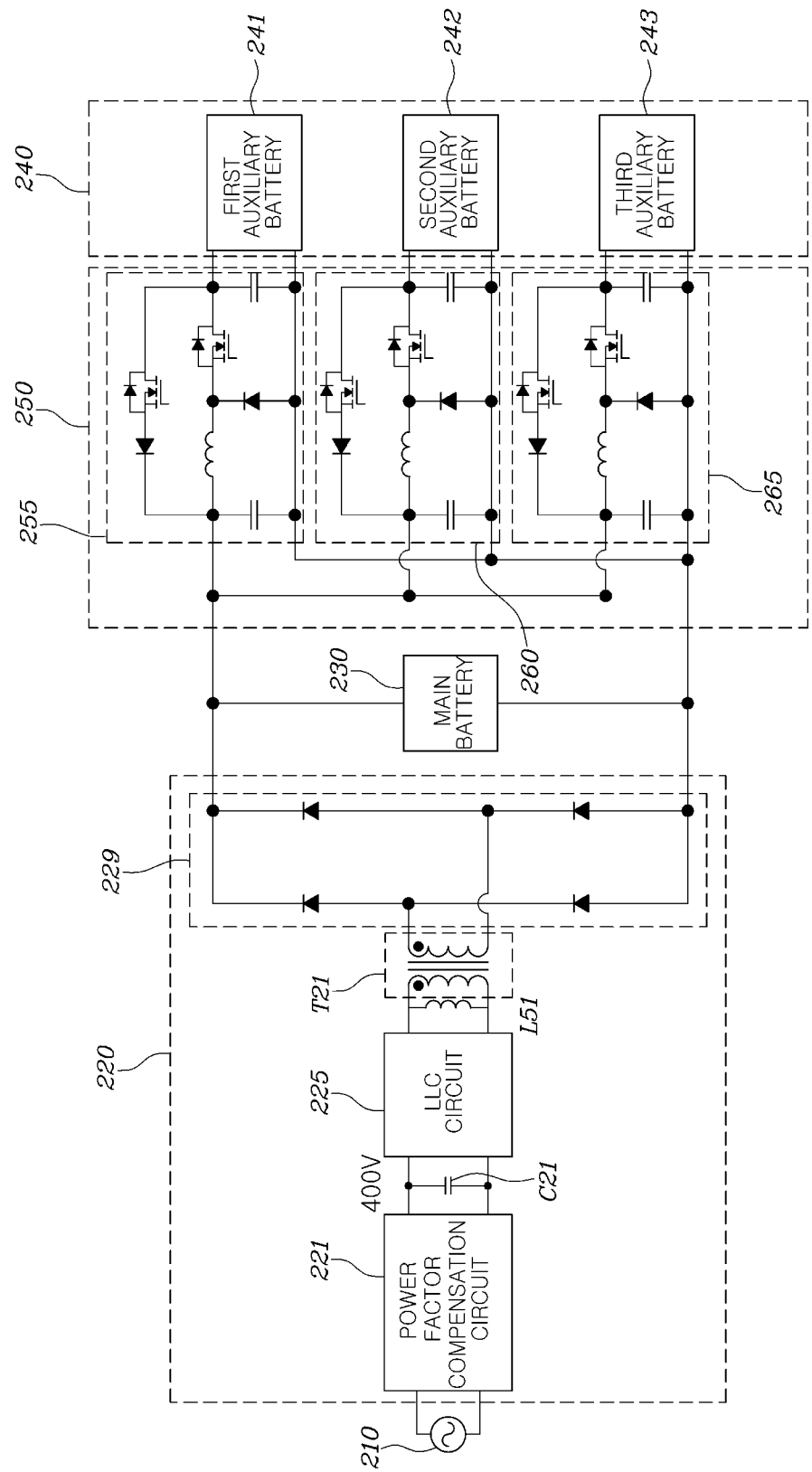
FIG. 2 shows a power conversion system according to an exemplary embodiment of the present invention.

FIG. 2 shows a power conversion system according to an exemplary embodiment of the present invention.

Referring to FIG. 2, the power conversion system according to this embodiment includes an AC power source 210, an on-board charger (OBC) 220, a main battery 230, an auxiliary battery 240, and a power converter 250.

AC power from the AC power source 210 is applied to the on-board charger 220 in order to recharge the main battery 230. In this case, the AC power source 210 may be a power source installed in external charging equipment.

The on-board charger 220 converts an AC voltage from the AC power source 210 into a DC voltage capable of recharging the main battery 230, and then supplies the DC voltage to the main battery 230. The on-board charger 220 includes a power factor compensation circuit 221, a link capacitor C21, an LLC circuit 225, a transformer T21, and a rectifier circuit 229. In this case, the power factor compensation circuit 221, the link capacitor C21, the LLC circuit 225, the transformer T21, and the rectifier circuit 229 may be implemented in various topologies in the present technical field.

The main battery 230 is recharged with power and supplies the charged power to a motor (not shown), thereby supplying rotation force to a wheel of a vehicle. In this case, the main battery 230 may be recharged by DC charging power supplied from the on-board charger 220 or the auxiliary battery 240. The main battery 230 may be a low-voltage output type battery and, may be, for example, a 48V standard battery. In this case, although the main battery 230 is of a 48V standard, the main battery 230 may have an output in various ranges of 30 to 60V in accordance with a state of charge (SOC) thereof.

The auxiliary battery 240 is constituted by a plurality of auxiliary batteries 241, 242, and 243, and assists a function of an energy source for recharging the main battery 230 or driving the motor of the main battery 230. In this case, the auxiliary battery 240 may be a low-voltage output type battery and, may be, for example, a 48V standard battery. Although the auxiliary battery 240 is of a 48V standard, the auxiliary battery 240 may have an output in various ranges of 30 to 60V in accordance with a state of charge (SOC) thereof, similarly to the main battery 230.

In this case, the auxiliary battery 240 may be provided in the form of a swappable battery.

The power converter 250 converts a voltage of the auxiliary battery 240 into a voltage having a level suitable for charging the main battery 230. In this case, since both the auxiliary battery 240 and the main battery 230 have DC voltages, the power converter 250 functions as a DC-DC converter. In this case, the power converter 250 includes a plurality of power converters 255, 260, and 265 equal in number to the plurality of auxiliary batteries 241, 242, and 243 such that the power converters 255, 260, and 265 are connected to the auxiliary batteries 241, 242, and 243, respectively. A concrete structure of the power converter 250 will be described in detail with reference to an auxiliary battery power conversion device of FIGS. 3 and 4 which will be described later.

Figure 3:
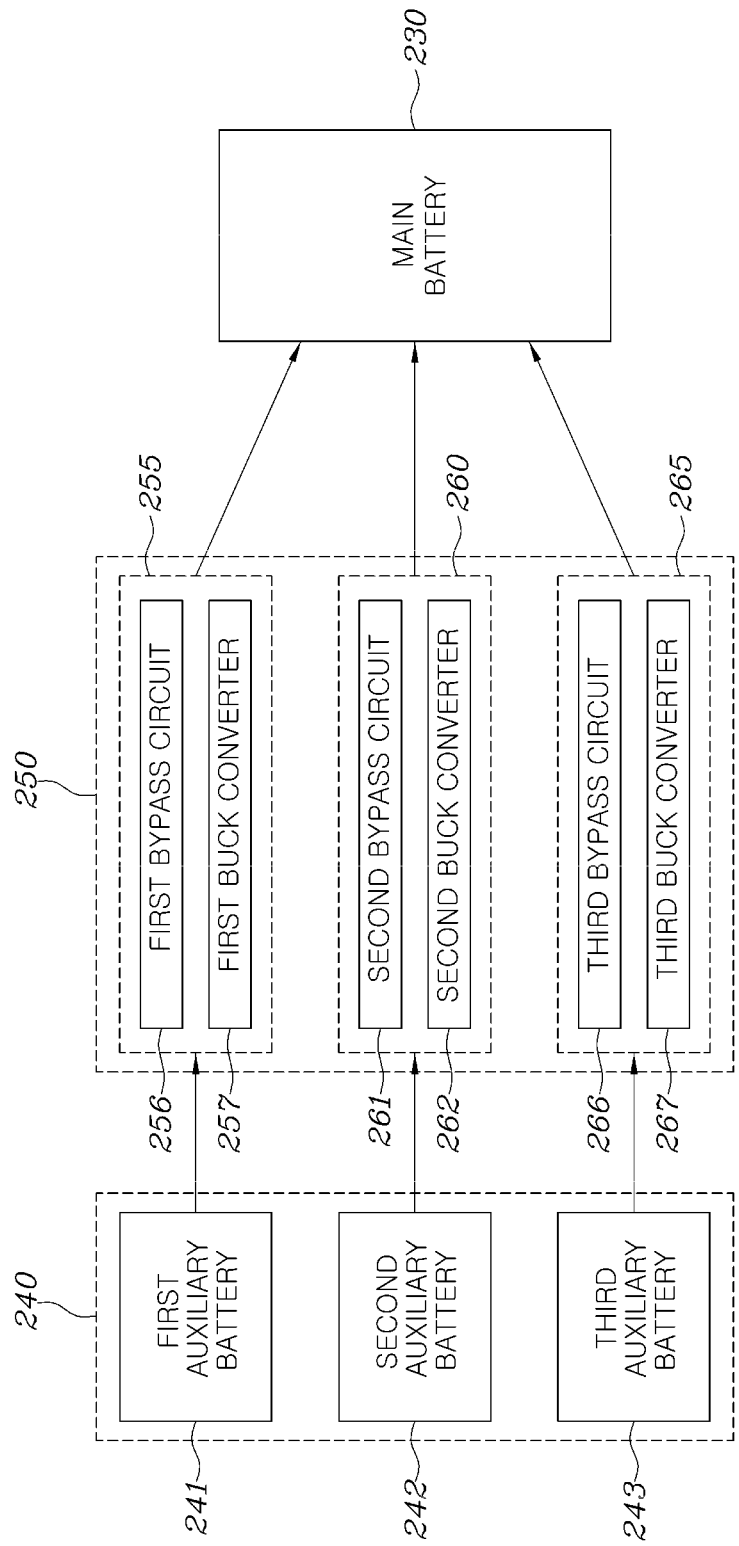
FIG. 3 shows an auxiliary battery power conversion device according to an exemplary embodiment of the present invention.

FIG. 3 shows an auxiliary battery power conversion device according to an exemplary embodiment of the present invention.

Referring to FIG. 3, the power conversion device according to this embodiment includes a main battery 230, an auxiliary battery 240, and a power converter 250. In this case, the auxiliary battery power conversion device of FIG. 3 may constitute a part of the power conversion system of FIG. 2.

The main battery 230 is recharged with power, and supplies the charged power to a motor (not shown), thereby supplying rotation force to a wheel of a vehicle. In this case, the main battery 230 may be recharged by DC charging power supplied from the auxiliary battery 240. The main battery 230 may be a low-voltage output type battery and, may be, for example, a 48V standard battery. In this case, although the main battery 230 is of a 48V standard, the main battery 230 may have an output in various ranges of 30 to 60V in accordance with a state of charge (SOC) thereof.

The auxiliary battery 240 assists a function of an energy source for recharging the main battery 230 or driving the motor of the main battery 230.

The auxiliary battery 240 may include a plurality of auxiliary batteries 241, 242, and 243. Although the auxiliary battery 240 is shown as being configured through inclusion of first to third auxiliary batteries 241, 242, and 243 in the embodiment of FIG. 3, this is only illustrative, and the auxiliary battery 240 may include various numbers of auxiliary batteries.

In this case, the auxiliary battery 240 may be a low-voltage output type battery and, may be, for example, a 48V standard battery. Although the auxiliary battery 240 is of a 48V standard, the auxiliary battery 240 may have an output in various ranges of 30 to 60V in accordance with a state of charge (SOC) thereof, similarly to the main battery 230.

In this case, the auxiliary battery 240 may be provided in the form of a swappable battery.

The power converter 250 converts a voltage of the auxiliary battery 240 into a voltage having a level suitable for charging the main battery 230. In this case, the power converter 250 may be configured to be equal in number to the plurality of auxiliary batteries 241, 242, and 243. Although the power converter 250 is shown as being configured through inclusion of first to third power converters 255, 260, and 265 in the embodiment of FIG. 3, this is only illustrative, and the power converter 250 may include various numbers of power converters.

Referring to FIG. 3, the first to third power converters 255, 260, and 265 may include respective bypass circuits 256, 261, and 266 and respective buck converters 257, 262, and 267. Each of the first to third auxiliary batteries 241, 242, and 243 is connected to a corresponding one of the first to third bypass circuits 256, 261, and 266 and a corresponding one of the first to third buck converters 257, 262, and 267.

In this case, each of the first to third auxiliary batteries 241, 242, and 243 is connected to the corresponding one of the first to third bypass circuits 256, 261, and 266 and the corresponding one of the first to third buck converters 257, 262, and 267, and a power supply path thereof connected to the main battery 230 is switched by the corresponding one of the first to third bypass circuits 256, 261, and 266 and the corresponding one of the first to third buck converters 257, 262, and 267.

When voltages of the auxiliary batteries 241, 242, and 243 respectively connected to the buck converters 257, 262, and 267 are higher than the voltage of the main battery 230, the buck converters 257, 262, and 267 drop the voltages of the auxiliary batteries 241, 242, and 243, respectively, and supply the dropped voltages to the main battery 230. In this case, the voltages supplied to the main battery 230 through the buck converters 257, 262, and 267 may be used to recharge the main battery 230.

Meanwhile, a circuit of each of the bypass circuits 256, 261, and 266 operates when the voltage of a corresponding one of the auxiliary batteries 241, 242, and 243 connected thereto is equal to the voltage of the main battery 230, thereby electrically connecting the corresponding one of the auxiliary batteries 241, 242, and 243 to the main battery 230. In this case, powers supplied from the auxiliary batteries 241, 242, and 243 via the bypass circuits 256, 261, and 266 may assist a function of an energy source for driving the motor of the main battery 230.

Meanwhile, the power converters 255, 260, and 265 may operate in an individual manner in accordance with voltages charged in the auxiliary batteries 241, 242, and 243, respectively. Accordingly, each of the power converters 255, 260, and 265 may independently operate irrespective of operation of the remaining ones of the power converters 255, 260, and 265.

Although the auxiliary battery power conversion device is shown as including three auxiliary batteries 241, 242, and 243 and three power converters 255, 260, and 265 in this embodiment, this is only illustrative, and the auxiliary battery power conversion device may include various numbers of auxiliary batteries and power converters.

Figure 4:
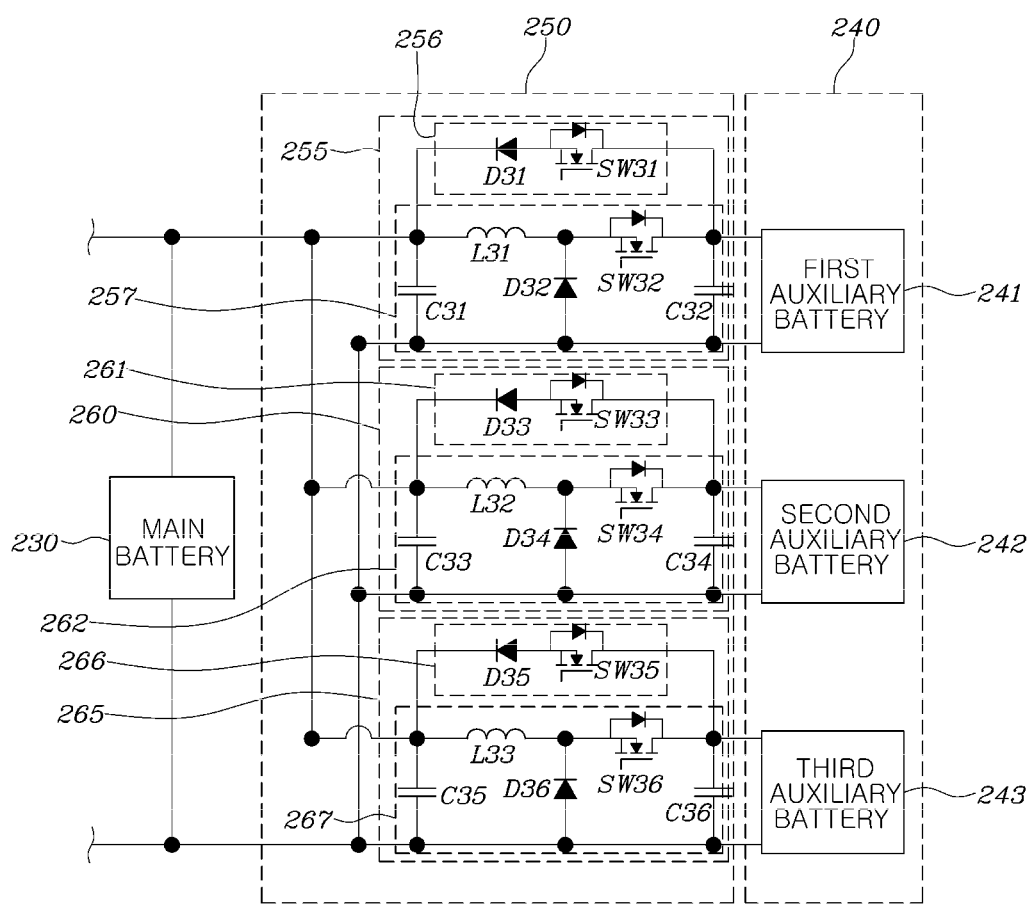
FIG. 4 shows an example of a circuit of the auxiliary battery power conversion device according to the embodiment of FIG. 3.

FIG. 4 shows an example of a circuit of the auxiliary battery power conversion device according to the embodiment of FIG. 3.

Referring to FIG. 4, the bypass circuits 256, 261, and 266 include respective diodes D31, D33, and D35 and respective switches SW31, SW33, and SW35.

In addition, the buck converters 257, 262, and 267 include buck switches SW32, SW34, and SW36, respectively.

In this case, each of the buck switches SW32, SW34, and SW36 operates to be rapidly switched on/off when the voltage of a corresponding one of the auxiliary batteries 241, 242, and 243 connected thereto is higher than the voltage of the main battery 230. On the other hand, each of the buck switches SW32, SW34, and SW36 does not operate when the voltage of the corresponding one of the auxiliary batteries 241, 242, and 243 is not higher than the voltage of the main battery 230. Accordingly, when each of the auxiliary batteries 241, 242, and 243 has a higher voltage than the voltage of the main battery 230, the voltage thereof is converted into a voltage for recharging the main battery 230 through a corresponding one of the buck converters 257, 262, and 267 respectively connected to the auxiliary batteries 241, 242, and 243, thereby recharging the main battery 230.

Meanwhile, each of the buck converters 257, 262, and 267 may be configured through further inclusion of two capacitors, one inductor, and one diode.

For example, the first buck converter 257 may be configured through inclusion of first and second capacitors C31 and C32, a first inductor L31, a second diode D32, and the first buck switch SW32.

In addition, the second buck converter 262 may be configured through inclusion of third and fourth capacitors C33 and C34, a second inductor L32, a fourth diode D34, and the second buck switch SW34.

In addition, the third buck converter 267 may be configured through inclusion of fifth and sixth capacitors C35 and C36, a third inductor L33, a sixth diode D36, and the third buck switch SW36.

In accordance with this embodiment, it may be possible to minimize the capacity of the relatively expensive buck converter while maximizing the capacity of the relatively inexpensive bypass circuit and, thereby achieving a reduction in cost. For example, the system may be configured by using a converter having a capacity of 1 kW as the buck converter while using a bypass circuit having a capacity of 6 kW as the bypass circuit.

Figure 5:
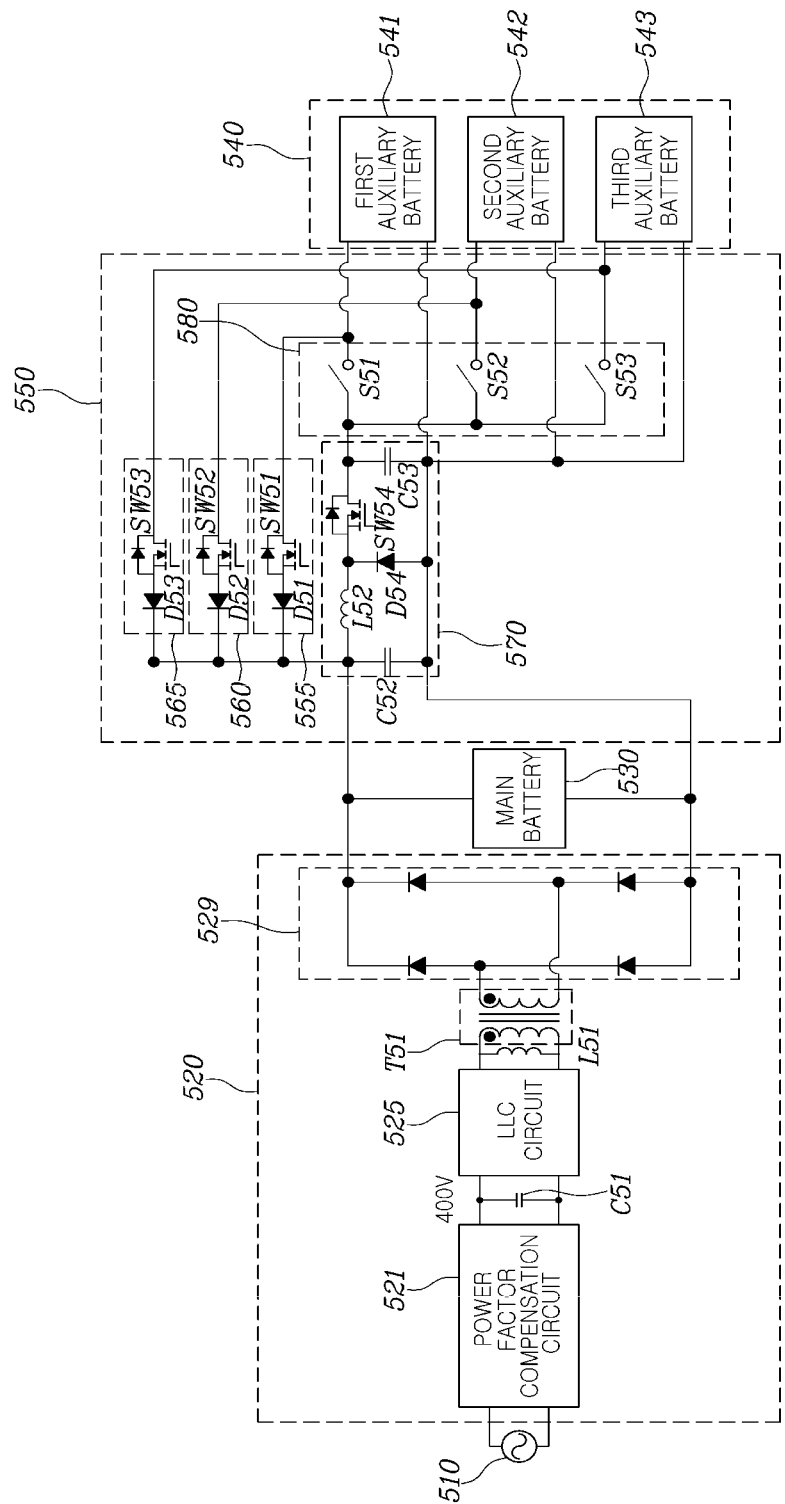
FIG. 5 shows a power conversion system according to another exemplary embodiment of the present invention.

FIG. 5 shows a power conversion system according to another exemplary embodiment of the present invention.

Referring to FIG. 5, the power conversion system according to this embodiment includes an AC power source 510, an on-board charger 520, a main battery 530, an auxiliary battery 540, and a power converter 550.

AC power from the AC power source 510 is applied to the on-board charger 520 in order to recharge the main battery 530. In this case, the AC power source 510 may be a power source installed in external charging equipment.

The on-board charger 520 converts an AC voltage from the AC power source 510 into a DC voltage capable of recharging the main battery 530, and then supplies the DC voltage to the main battery 530. The on-board charger 520 includes a power factor compensation circuit 521, a link capacitor C51, an LLC circuit 525, a transformer T51, and a rectifier circuit 529. In this case, the power factor compensation circuit 521, the link capacitor C51, the LLC circuit 525, the transformer T51, and the rectifier circuit 529 may be implemented in various topologies in the present technical field.

The main battery 530 is recharged with power, and supplies the charged power to a motor (not shown), thereby supplying rotation force to a wheel of a vehicle. In this case, the main battery 530 may be recharged by DC charging power supplied from the on-board charger 520 or the auxiliary battery 540. The main battery 530 may be a low-voltage output type battery and, may be, for example, a 48V standard battery. In this case, although the main battery 530 is of a 48V standard, the main battery 530 may have an output in various ranges of 30 to 60V in accordance with a state of charge (SOC) thereof.

The auxiliary battery 540 is constituted by a plurality of auxiliary batteries 541, 542, and 543, and assists a function of an energy source for recharging the main battery 530 or driving the motor of the main battery 530. In this case, the auxiliary battery 540 may be a low-voltage output type battery and, may be, for example, a 48V standard battery. Although the auxiliary battery 540 is of a 48V standard, the auxiliary battery 540 may have an output in various ranges of 30 to 60V in accordance with a state of charge (SOC) thereof, similarly to the main battery 530.

In this case, the auxiliary battery 540 may be provided in the form of a swappable battery.

The power converter 550 converts a voltage of the auxiliary battery 540 into a voltage having a level suitable for charging the main battery 530. In this case, since both the auxiliary battery 540 and the main battery 530 have DC voltages, the power converter 550 functions as a DC-DC converter. A concrete structure of the power converter 550 will be described in detail with reference to an auxiliary battery power conversion device of FIGS. 6 and 7 which will be described later.

Figure 6:
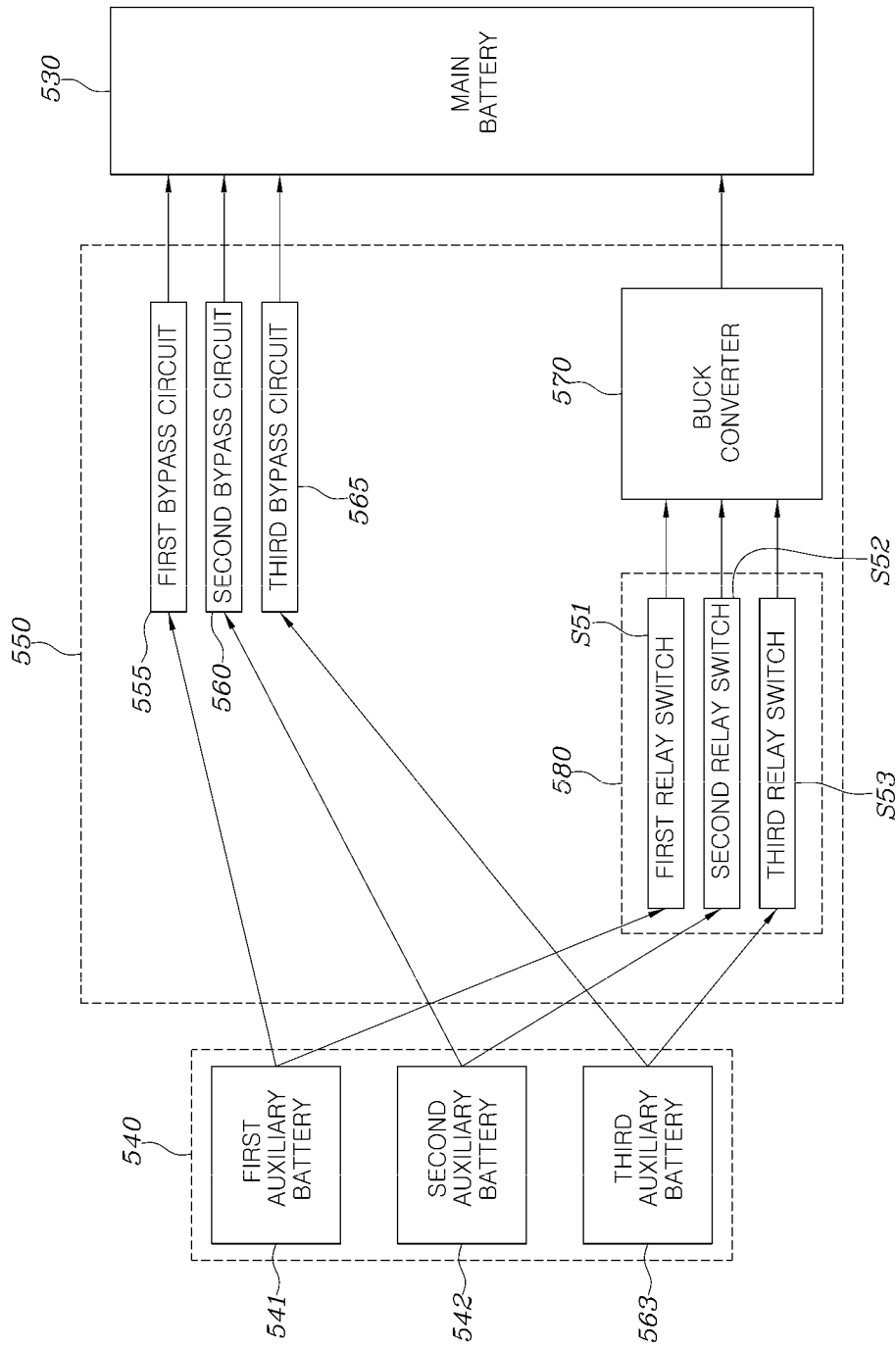
FIG. 6 shows an auxiliary battery power conversion device according to another exemplary embodiment of the present invention.

FIG. 6 shows an auxiliary battery power conversion device according to another exemplary embodiment of the present invention.

Referring to FIG. 6, the power conversion device according to this embodiment includes a main battery 530, an auxiliary battery 540, and a power converter 550. In this case, the auxiliary battery power conversion device of FIG. 6 may constitute a part of the power conversion system of FIG. 5.

The main battery 530 is recharged with power, and supplies the charged power to a motor (not shown), thereby supplying rotation force to a wheel of a vehicle. In this case, the main battery 530 may be recharged by DC charging power supplied from the auxiliary battery 540. The main battery 530 may be a low-voltage output type battery and, may be, for example, a 48V standard battery. In this case, although the main battery 530 is of a 48V standard, the main battery 530 may have an output in various ranges of 30 to 60V in accordance with a state of charge (SOC) thereof.

The auxiliary battery 540 assists a function of an energy source for recharging the main battery 530 or driving the motor of the main battery 530.

The auxiliary battery 540 may include a plurality of auxiliary batteries 541, 542, and 543.

In this case, the auxiliary battery 540 may be a low-voltage output type battery and, may be, for example, a 48V standard battery. Although the auxiliary battery 540 is of a 48V standard, the auxiliary battery 540 may have an output in various ranges of 30 to 60V in accordance with a state of charge (SOC) thereof, similarly to the main battery 530.

In this case, the auxiliary battery 540 may be provided in the form of a swappable battery.

The power converter 550 converts a voltage of the auxiliary battery 540 into a voltage having a level suitable for charging the main battery 530. In this case, the power converter 550 may include one buck converter 570, a plurality of bypass circuits 555, 560, and 565, and a plurality of relay switches S51, S52, and S53.

In this case, the plurality of bypass circuits 555, 560, and 565 and the plurality of relay switches S51, S52, and S53 may be configured to be equal in number to the plurality of auxiliary batteries 541, 542, and 543.

Referring to FIG. 6, each of the first to third auxiliary batteries 541, 542, and 543 is connected to the corresponding one of the bypass circuits 555, 560, and 565 and a corresponding one of the relay switches S51, S52, and S53. Each of the relay switches S51, S52, and S53 connects or disconnects the corresponding auxiliary battery and the corresponding buck converter to or from each other in accordance with ON/OFF control thereof.

In addition, power supply paths of the auxiliary batteries 541, 542, and 543 connected to the main battery 530 are switched by the buck converter 570 and respective bypass circuits 555, 560, and 565 connected to the auxiliary batteries 541, 542, and 543.

In this case, when voltages of the auxiliary batteries 541, 542, and 543 respectively connected to the relay switches S51, S52, and S53 are higher than the voltage of the main battery 530, the buck converter 570 drops the voltages of the auxiliary batteries 541, 542, and 543, and supplies the dropped voltages to the main battery 530. In this case, the voltages supplied to the main battery 530 through the buck converter 570 may be used to recharge the main battery 530.

Meanwhile, a circuit of each of the bypass circuits 555, 560, and 565 operates when the voltage of a corresponding one of the auxiliary batteries 541, 542, and 543 connected thereto is equal to the voltage of the main battery 530, thereby electrically connecting the corresponding one of the auxiliary batteries 541, 542, and 543 to the main battery 230. In this case, powers supplied from the auxiliary batteries 541, 542, and 543 via the bypass circuits 555, 560, and 565 may assist a function of an energy source for driving the motor of the main battery 530.

In this case, the relay switches S51, S52, and S53 may be set such that only one thereof is switched on at one time.

In addition, the relay switches S51, S52, and S53 may be set to be sequentially switched on in accordance with a predetermined priority order or a predetermined condition.

For example, the first to third relay switches S51, S52, and S53 may be sequentially switched on in an order of the first, second, and third relay switches S51, S52, and S53 respectively connected to the first, second, and third auxiliary batteries 541, 542, and 543. When the voltage of one of the first to third auxiliary batteries 541, 542, and 543 becomes equal to the voltage of the main battery 530, the relay switch connected to the auxiliary battery, the voltage of which becomes equal to the voltage of the main battery 530, may be switched off, and the relay switch next to the former relay switch may then be switched on.

In detail, when voltages of all of the first to third auxiliary batteries 541, 542, and 543 are higher than the voltage of the main battery 530, the first relay switch S51 is switched on until the voltage of the first auxiliary battery 541 becomes equal to the voltage of the main battery 530 and, as such, the main battery 530 is recharged with the voltage from the first auxiliary battery 541. When the voltage of the first auxiliary battery 541 becomes equal to the voltage of the main battery 530, the first relay switch S51 is switched off and, as such, current may flow between the first auxiliary battery 541 and the main battery 530 via the first bypass circuit 555. In this case, the first auxiliary battery 541 may assist a function of an energy source for driving the motor of the main battery 530.

In this case, when the voltage of the second auxiliary battery 542 is higher than the voltage of the main battery 530, the second relay switch S52 is switched on until the voltage of the second auxiliary battery 542 becomes equal to the voltage of the main battery 530 and, as such, the main battery 530 is recharged with the voltage from the second auxiliary battery 542. When the voltage of the second auxiliary battery 542 becomes equal to the voltage of the main battery 530, the second relay switch S52 is switched off and, as such, current may flow between the second auxiliary battery 542 and the main battery 530 via the second bypass circuit 560. In this case, the second auxiliary battery 542 may assist a function of an energy source for driving the motor of the main battery 530.

In this case, when the voltage of the third auxiliary battery 543 is higher than the voltage of the main battery 530, the third relay switch S53 is switched on until the voltage of the third auxiliary battery 543 becomes equal to the voltage of the main battery 530 and, as such, the main battery 530 is recharged with the voltage from the third auxiliary battery 543. When the voltage of the third auxiliary battery 543 becomes equal to the voltage of the main battery 530, the third relay switch S53 is switched off and, as such, current may flow between the third auxiliary battery 543 and the main battery 530 via the third bypass circuit 565. In this case, the third auxiliary battery 543 may assist a function of an energy source for driving the motor of the main battery 530.

Meanwhile, although not shown, the auxiliary battery power conversion device according to this embodiment may further include a relay controller and, as such, may control ON/OFF of the relay switches S51, S52, and S53 in accordance with a predetermined condition or a predetermined priority order.

Figure 7:
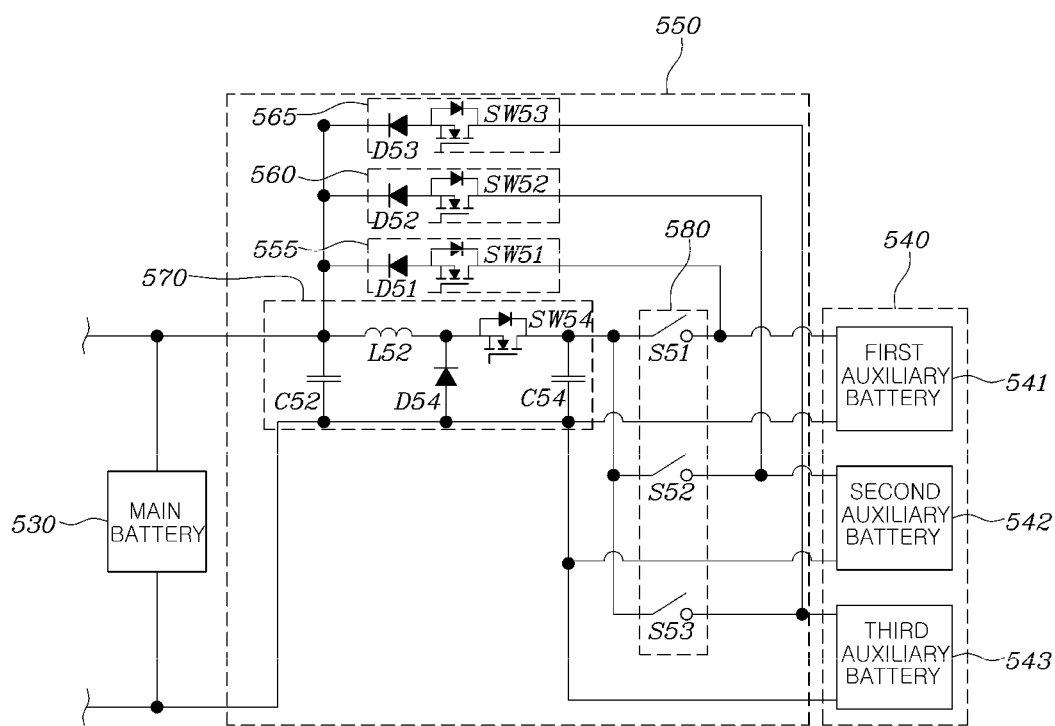
FIG. 7 shows an example of a circuit of the auxiliary battery power conversion device according to the embodiment of FIG. 6.

FIG. 7 shows an example of a circuit of the auxiliary battery power conversion device according to the embodiment of FIG. 6.

Referring to FIG. 7, the first to third bypass circuits 555, 560, and 565 include respective diodes D51, D52, and D53 and respective bypass switches SW5*i*, SW52, and SW53.

In addition, the buck converter 570 includes two capacitors C52 and C54, one inductor L52, one diode D54, and one buck switch SW54.

In this case, the buck switch SW54 operates to be rapidly switched on/off when voltages of the auxiliary batteries 541, 542, and 543 electrically connected thereto are higher than the voltage of the main battery 530. On the other hand, the buck switch SW54 does not operate when the voltages of the auxiliary batteries 541, 542, and 543 are not higher than the voltage of the main battery 230. Accordingly, when each of the auxiliary batteries 541, 542, and 543 has a higher voltage than the voltage of the main battery 530, and the relay switches S51, S52, and S53 connected between respective auxiliary batteries 541, 542, and 543 and the buck converter 570 are switched on, the voltage of each of the auxiliary batteries 541, 542, and 543 is converted into a voltage for recharging the main battery 530 through the buck converter 570, thereby recharging the main battery 530.

Although the auxiliary battery 540 is shown as including three auxiliary batteries, that is, the first to third auxiliary batteries 541, 542, and 543, this is only illustrative, and the auxiliary battery 540 may include various numbers of auxiliary batteries.

In accordance with this embodiment, the auxiliary batteries are sequentially discharged and, as such, only the discharged auxiliary batteries may first be replaced. Accordingly, it may be possible to not only efficiently manage the capacity of the auxiliary battery, but also to reduce the cost incurred to configure the system through a reduction in circuit parts.

In accordance with the exemplary embodiments of the present invention described heretofore, it may be possible to not only stably manage a state of charge of the auxiliary battery, but also to effectively control charging current, and, as such, an increase in the range of the electric vehicle and an enhancement in power performance of the electric vehicle may be achieved.

In addition, the user may directly replace a discharged auxiliary battery with a new one in a place where a battery is replaceable.

Furthermore, it may be possible to achieve a reduction in cost by minimizing the capacity of the buck converter while designing the bypass circuit to have a high capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power conversion system comprising:
    a main battery configured to be recharged with power and to supply the recharged power to a motor, thereby supplying rotation force to a wheel of a vehicle;
    an auxiliary battery configured to recharge the main battery or to assist a power supply function of the main battery; and
    a power converter connected to the auxiliary battery, the power converter comprising a bypass circuit and a buck converter, wherein:
        the buck converter comprises a buck switch, and is configured to convert a voltage of the auxiliary battery into a voltage for recharging the main battery in accordance with an ON/OFF switching operation of the buck switch,
        the bypass circuit comprises a plurality of bypass circuits, and the buck converter comprises a plurality of buck converters, and
        the auxiliary battery comprises a plurality of auxiliary batteries connected to respective bypass circuits and respective buck converters, and a power supply path of each of the auxiliary batteries connected to the main battery is switched by a corresponding one of the bypass circuits and a corresponding one of the buck converters.

2. The power conversion system according to claim 1, wherein the buck switch operates to be repeatedly switched on and off when the voltage of the auxiliary battery is higher than a voltage of the main battery, and does not operate when the voltage of the auxiliary battery is not higher than the voltage of the main battery.

3. The power conversion system according to claim 2, wherein the bypass circuit is configured to electrically interconnect the auxiliary battery and the main battery when the voltage of the auxiliary battery is equal to the voltage of the main battery.

4. The power conversion system according to claim 1, wherein:
    the plurality of auxiliary batteries are further connected to respective relay switches;
    each relay switch of the respective relay switches is configured to connect or disconnect a corresponding one of the plurality of auxiliary batteries to or from the buck converter; and
    the power supply path of each of the plurality of auxiliary batteries connected to the main battery is configured to be switched by the buck converter and the bypass circuit connected to the auxiliary battery.

5. The power conversion system according to claim 4, wherein the respective relay switches are configured to be set such that only one thereof is switched on at one time.

6. The power conversion system according to claim 5, wherein the respective relay switches are configured to be sequentially switched on in accordance with a predetermined priority order.

7. The power conversion system according to claim 1, wherein the auxiliary battery is provided in a form of a swappable battery.

8. The power conversion system according to claim 1, wherein the bypass circuit comprises:
    a first diode; and
    a first switch connected to the first diode in series.

9. The power conversion system according to claim 8, wherein the buck converter comprises:
    first and second capacitors;
    a first inductor and the buck switch interconnected in series between one end of the first capacitor and one end of the second capacitor; and
    a second diode connected, at one end thereof, to a node between the first inductor and the buck switch while being connected, at another end thereof, to a node between the first capacitor and the second capacitor.

10. A DC-DC converter configured to receive an input voltage and generate an output voltage, the DC-DC converter comprising:
    a power converter connected to a main battery and an auxiliary battery, the power converter comprising a bypass circuit and a buck converter, wherein:
        the buck converter comprises a buck switch, and is configured to convert a voltage of the auxiliary battery into a voltage for recharging the main battery in accordance with an ON/OFF switching operation of the buck switch,
        the bypass circuit comprises a plurality of bypass circuits, and the buck converter comprises a plurality of buck converters, and
        the auxiliary battery comprises a plurality of auxiliary batteries connected to respective bypass circuits and respective buck converters, and a power supply path of each of the auxiliary batteries connected to the main battery is configured to be switched by a corresponding one of the bypass circuits and a corresponding one of the buck converters.

11. The DC-DC converter according to claim 10, wherein the buck switch is configured to be repeatedly switched on and off when the voltage of the auxiliary battery is higher than a voltage of the main battery, and does not operate when the voltage of the auxiliary battery is not higher than the voltage of the main battery.

12. The DC-DC converter according to claim 11, wherein the bypass circuit electrically interconnects the auxiliary battery and the main battery when the voltage of the auxiliary battery is equal to the voltage of the main battery.

13. The DC-DC converter according to claim 10, wherein:
the plurality of auxiliary batteries are further connected to respective relay switches;
each relay switch of the respective relay switches is configured to connect or disconnect a corresponding one of the plurality of auxiliary batteries to or from the buck converter in accordance with the ON/OFF switching operation thereof; and
the power supply path of each of the plurality of auxiliary batteries connected to the main battery is configured to be switched by the buck converter and the bypass circuit connected to the auxiliary battery.

14. The DC-DC converter according to claim 13, wherein the respective relay switches are configured to be set such that only one thereof is switched on at one time.

15. The DC-DC converter according to claim 14, wherein the respective relay switches are configured to be sequentially switched on in accordance with a predetermined priority order.

16. The DC-DC converter according to claim 10, wherein the bypass circuit comprises:
a first diode; and
a first switch connected to the first diode in series.

17. The DC-DC converter according to claim 16, wherein the buck converter comprises:
first and second capacitors;
a first inductor and the buck switch interconnected in series between one end of the first capacitor and one end of the second capacitor; and
a second diode connected, at one end thereof, to a node between the first inductor and the buck switch while being connected, at another end thereof, to a node between the first capacitor and the second capacitor.

18. A method of operating a power system comprising a power converter and a bypass circuit connected to a main battery and an auxiliary battery, wherein the bypass circuit comprises a plurality of bypass circuits, and the power converter comprises a plurality of buck converters, and the auxiliary battery comprises a plurality of auxiliary batteries connected to respective bypass circuits and respective buck converters, the method comprising:
converting a voltage of the auxiliary battery into a voltage for recharging the main battery, converting the voltage comprising repeatedly switching a buck switch of the power converter on and off when the voltage of the auxiliary battery is higher than a voltage of the main battery, and not switching the buck switch when the voltage of the auxiliary battery is not higher than the voltage of the main battery, wherein a power supply path of each of the auxiliary batteries connected to the main battery is switched by a corresponding one of the bypass circuits and a corresponding one of the buck converters; and
supplying power from the main battery to a motor to provide rotation force to a wheel of a vehicle.

* * * * *